United States Patent
Davis (10) Patent No.: US 10,245,885 B2
(45) Date of Patent: Apr. 2, 2019

(54) PALLET DOLLY PULLER SYSTEM

(71) Applicant: Raymond E. Davis, Heath, TX (US)

(72) Inventor: Raymond E. Davis, Heath, TX (US)

( * ) Notice: Subject to any disclaimer, the term of this patent is extended or adjusted under 35 U.S.C. 154(b) by 0 days.

(21) Appl. No.: 15/670,984

(22) Filed: Aug. 7, 2017

(65) Prior Publication Data
US 2018/0022155 A1    Jan. 25, 2018

Related U.S. Application Data

(63) Continuation-in-part of application No. 15/086,017, filed on Mar. 30, 2016, now abandoned.

(51) Int. Cl.
| | |
|---|---|
| B60B 33/00 | (2006.01) |
| B60B 33/02 | (2006.01) |
| B62B 3/02 | (2006.01) |
| B62B 5/00 | (2006.01) |
| B62B 5/06 | (2006.01) |

(52) U.S. Cl.
CPC ...... *B60B 33/0023* (2013.01); *B60B 33/0005* (2013.01); *B60B 33/0028* (2013.01); *B60B 33/02* (2013.01); *B62B 3/02* (2013.01); *B62B 5/0063* (2013.01); *B62B 5/0089* (2013.01); *B60B 33/0036* (2013.01); *B60B 33/0063* (2013.01); *B62B 5/0079* (2013.01); *B62B 5/065* (2013.01); *B62B 2202/90* (2013.01); *B62B 2207/02* (2013.01); *B62B 2207/04* (2013.01); *B62B 2301/08* (2013.01); *B62B 2301/254* (2013.01)

(58) Field of Classification Search
CPC ............ B62B 1/06; B62B 1/20; B62B 5/0083

USPC .......................................................... 414/490
See application file for complete search history.

(56) References Cited

U.S. PATENT DOCUMENTS

| | | | | |
|---|---|---|---|---|
| 4,213,624 A | * | 7/1980 | Sanders | B62B 3/0606 280/43.12 |
| 4,925,357 A | * | 5/1990 | Cisternino | B62B 5/0083 254/8 R |
| 5,246,239 A | * | 9/1993 | Braden | B62B 1/06 280/47.24 |
| 5,249,908 A | * | 10/1993 | Tsai | B62B 3/0606 280/46 |
| 8,403,344 B2 | * | 3/2013 | Carver | B60T 1/14 280/30 |
| 8,740,228 B2 | * | 6/2014 | Patterson | B62B 3/16 206/503 |
| 2003/0235488 A1 | * | 12/2003 | Hadar | B62B 3/10 414/495 |
| 2008/0107511 A1 | * | 5/2008 | Oberg | B62B 1/06 414/445 |
| 2013/0300078 A1 | * | 11/2013 | Gundogan | B62B 3/008 280/62 |
| 2015/0166314 A1 | * | 6/2015 | Xu | B66F 9/065 414/809 |

\* cited by examiner

*Primary Examiner* — Kaitlin S Joerger
(74) *Attorney, Agent, or Firm* — Baker Law Firm (57) ABSTRACT

A pallet moving system includes a pallet dolly puller, and a pallet dolly with a guiding structure thereon permitting and facilitating the blind engagement and disengagement of the dolly puller to the pallet. The dolly puller includes caster wheels, a handle, and at least one projecting portion configured to mateably couple with recessed portions on the underside of the pallet dolly in order that the pallet dolly may be moved and readily re-positioned even in confined spaces.

12 Claims, 10 Drawing Sheets

PALLET DOLLY PULLER SYSTEM

CROSS REFERENCES TO RELATED APPLICATIONS

This Application is a Continuation of U.S. Non-Provisional application Ser. No. 15/086,017 filed Mar. 30, 2016 and titled "Pallet Dolly Puller System."

FIELD

The invention relates generally to pallet dollys and the locomotion of same.

BACKGROUND

A pallet dolly is a wheeled pallet typically used to support merchandise, crates, stock items or materiel required in a business. A pallet dolly has an advantage over a plain non-wheeled dolly in that it does not require a pallet jack to relocate or reposition a laden pallet. Nevertheless, pullers, which may consist of a hook portion and a handle portion for temporary coupling to a pallet dolly may be used to reposition or relocate the pallet.

Pallet moving means such as the hook with handle, are frequently difficult to couple to a pallet dolly when a crate or box overhangs portions of the pallet dolly bounds, blocking access of the puller.

It would be desirable to provide a paired pallet dolly and dolly puller system that permits ready engagement and disengagement of the puller to the pallet dolly irrespective of the arrangement of materiel atop the pallet dolly.

It would be further desirable if a pallet dolly of the foregoing system includes a guiding means for a dolly puller permitting "blind" engagement of the puller to the pallet dolly.

It would be still further desirable if the dolly puller of the system includes complimentary guiding means to the pallet dolly.

It would be especially desirable if the dolly puller of the system includes caster wheels to facilitate ready engagement and disengagement with the pallet dolly, and to augment the caster wheels of the pallet dolly.

SUMMARY

In a general aspect of the present invention, a dolly puller system includes a pallet dolly; typically including caster wheels, and, a rollable doly puller that is blindly engageable with the pallet dolly which permits a person to attach the puller to the pallet dolly without having to visually locate entry points for the dolly puller that are difficult to find in the dark and at the bottom of a stack of 7 or 8 cases of drinks or the like. The pallet dolly includes two openings that guide portions of the dolly puller into and under the dolly that snap into place allowing the user to pull or push the dolly in any direction have control of movement in all four directions.

In a first aspect, a pallet dolly has a top, sides and a bottom. Along the sides are guiding structures including recesses that are configured to accept and guide a portion of the dolly puller into a coupled configuration with the pallet dolly.

In a second aspect, a dolly puller includes projecting portions that are shaped and sized to mate with portions of the pallet dolly.

In whatever aspect, the pallet dolly provides a means for the dolly puller to "dock" with the pallet dolly in cases where the guiding structure(s) of the pallet dolly is obscured by overhanging crates or boxes It is to be understood that objects, features and aspects of any of the embodiments disclosed herein may be combined or substituted with any object, feature or aspect of any other embodiment disclosed herein.

While in the particular embodiments disclosed herein, the pallet material is a thermoplastic, while the dolly puller is of metal composition, material substitutions or combinations are conceivable.

While in the particular embodiments disclosed herein, the projecting portions of the dolly puller include a cylindrical stub that is capped with an circumferential end that is of greater diameter than the stub, some embodiments may includes a stub that is of equal or greater diameter than the circumferential end.

While in the particular embodiments disclosed herein, the circumferential end of the projecting portion is tapered (e.g., conical), the specific degree of taper may vary, and the tapering may terminate in a rounded portion.

While in the particular embodiments disclosed herein, the guide entryway(s) to for the dolly puller are arched, it is conceivable that other shapes may be used to compliment, receive and mate with the projecting portions of the dolly puller. Accordingly, the particular shape of the guide entryway may be any shape capable of accommodating the features, objects and aspects of the disclosed invention.

While in the particular embodiments disclosed herein, the dolly puller includes a pair of caster wheels, the specific number and arrangement of the caster wheels mounted to the dolly puller may vary. Likewise, the specific number and arrangement of the caster wheels mounted to the pallet dolly may vary. For example, although the caster wheels shown are fixed direction type, other swivelable casters may be used.

It should be understood that the features, objects and aspects of any one embodiment may be added to or combined with the features, objects or aspects of any other embodiment.

REFERENCE TO THE NUMBERED ELEMENTS 100 dolly puller
120 dolly puller handle
130 projection
140 cap
150 platform
160 platform stop
170 dolly puller caster
200 pallet dolly
210 pallet dolly top
220 pallet dolly bottom
224 pallet dolly sides
230 pallet puller guide
240 puller guide entryway
241 alternate guide entryway
242 overhang
250 puller guide recess
260 dolly caster
262 dolly caster plate
270 fitment tabs
280 grips
284 ring
300 cargo Definitions In the following description, the term "pallet dolly" refers to pallets having an integrated rolling means such as caster wheels mounted to the bottom of the pallet dolly. The term "cap," "capped portion," are synonymous and mean a crown or terminus that is differentiated from adjacent portions or elements supportive of the cap. Unless otherwise explained, any technical terms used herein have the same meaning as commonly understood by one of ordinary skill in the art to which this disclosure belongs. The singular terms "a", "an", and "the" include plural referents unless the context clearly indicates otherwise. Similarly, the word "or" is intended to include "and" unless the context clearly indicates otherwise. Although methods and materials similar or equivalent to those described herein can be used in the practice or testing of this disclosure, suitable methods and materials are described below. The term "comprises" means "includes." All publications, patent applications, patents, and other references listed in this disclosure are incorporated by reference in their entirety for all purposes. In case of conflict, the present specification, including explanations of terms, will control. In addition, the materials, methods, and examples are illustrative only and not intended to be limiting.

DETAILED DESCRIPTION OF THE EMBODIMENTS

Referring generally to FIGS. 2-14, a pallet dolly moving system includes a pallet dolly (200) with a top (210), sides (224) and a bottom (220), wherein the sides include entry points for portions of a dolly puller that include a rolling platform (150) with handle (120). Atop the platform are a pair of projecting portions (130) that are capped (140) with a circumferential cone having a rounded apex. Caster wheels (170) are mounted beneath the platform and permit the platform to be rolled along the floor in any direction. Guide entryways (240) at sides (224) of the pallet dolly are configured to accept cap(s) (140) and guide the circumferential cone of the cap and projecting portions of the dolly puller into a nesting arrangement with the recesses on the underside of the pallet dolly.

The pallet dolly (200) is of molded thermoplastic composition and includes structural ribbing on the underside of the pallet dolly, also having recesses transverse sides (224) of the pallet dolly (200), which define guide entryway(s) (240) that are in communication with recessed portions which define guide recess(es) (250) transverse the bottom (220) of the pallet dolly. Best depicted in (FIGS. 10a, 10b), the pallet dolly of the embodiment depicted includes securing elements for the caster plate (262) of the caster wheel assemblies (260) that obviate the need for threaded fasteners, rivets or other conventional fasteners that would otherwise be used to affix caster wheels to the underside of the dolly. The mounting plate(s) of the caster assemblies are press mounted to the bottom of the pallet dolly such that fitment tabs (270) snap over the plate (262) when pressed thereagainst due to the flexible nature of the tabs when the pallet dolly is first removed from the injection molder. As the plastic cools, the fitment tabs shrink slightly about the plate periphery to secure the plate tightly to the pallet underside. The pallet dolly (200) may also possess various moldings, rings (284), grips (280) or other structures to augment its relocation, stacking and handling.

Figure 1:
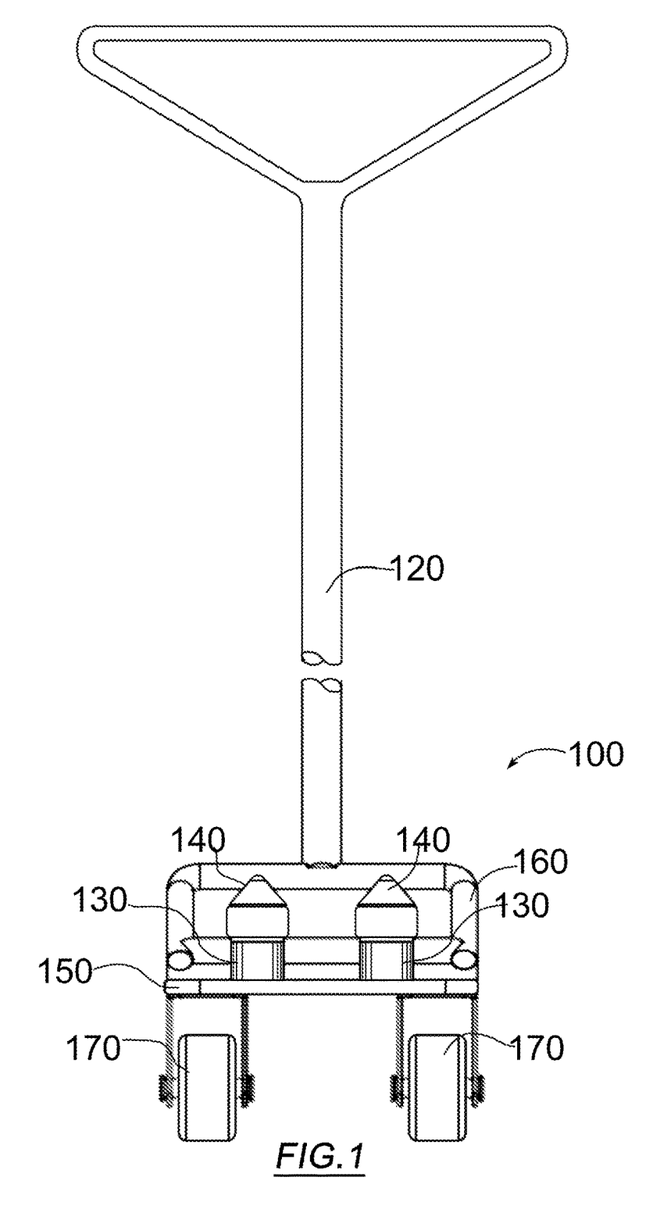
FIG. 1 is a front elevation of one embodiment according to the present invention.

FIG. 1 is a front elevation of a dolly puller according to some embodiments of the present invention, and includes a rollable platform (150) having a pair of projecting portions (130) topped with a projection cap (140). Adjacent the projecting portions is a platform stop (160) that is configured to abut a side (224) of the dolly pallet when the dolly puller is fully engaged, i.e., "docked," with the pallet dolly. The projection caps (140) may be static or may include a bearing surface, and accordingly may possess portions independently movable in relation to the projecting portions (130). The conical ends of the capped portions may be fixed or rotational relative to the remainder of the capped portions or the projecting portions. Conversely, the projecting portions (130), also termed "stubs" may possess a bearing portion that may or may not be static relative to the platform (150). Handle (120) may be any length desired. Although two caster wheel assemblies are shown affixed to the dolly puller, it is conceivable that one or any number of caster wheel assemblies (170) may be mounted to the dolly puller (100). The particular angle of the platform stop (160) in relation to the platform (150) as illustrated is merely exemplary, and may vary. The projecting portions (130) or the caps (140) can vary in height, and one or both may be height adjustable as a unit or independently.

Figure 2:
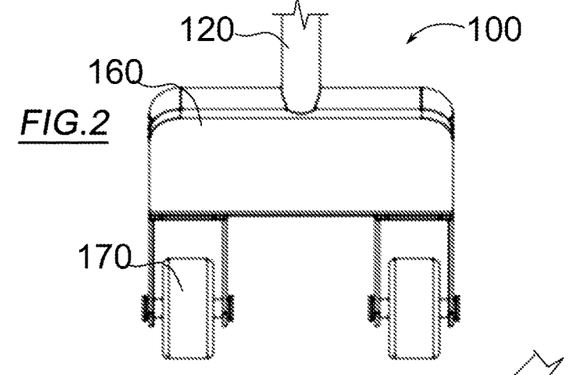
FIG. 2 is a back elevation of the embodiment shown in (FIG. 1)
Figure 3:
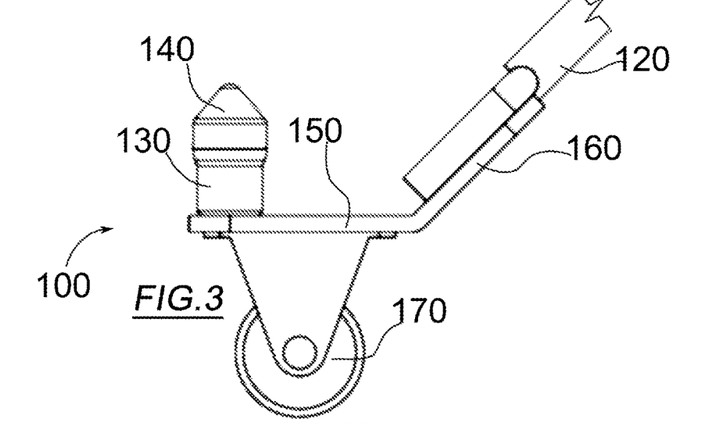
FIG. 3 is a side elevation of the embodiment shown in (FIG. 1)
Figure 4:
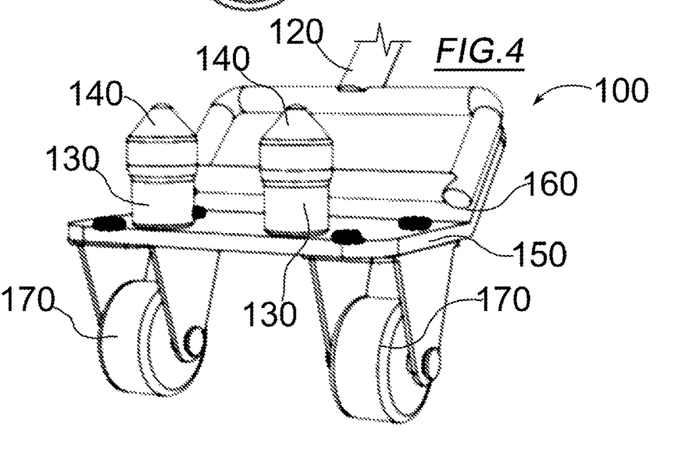
FIG. 4 is a perspective view of the embodiment shown in (FIG. 4)

FIGS. 2-4 show respectively, a back elevation, a side elevation and an isometric view of dolly puller (100). Although the particular caster wheel assemblies shown are not of the swivel type, it should be understood that swivel type casters may be used. Although the projecting portions (130) and platform caps (140) as illustrated are perpendicular to platform (150), in some embodiments, the angle of the projecting portions may vary.

Figure 5:
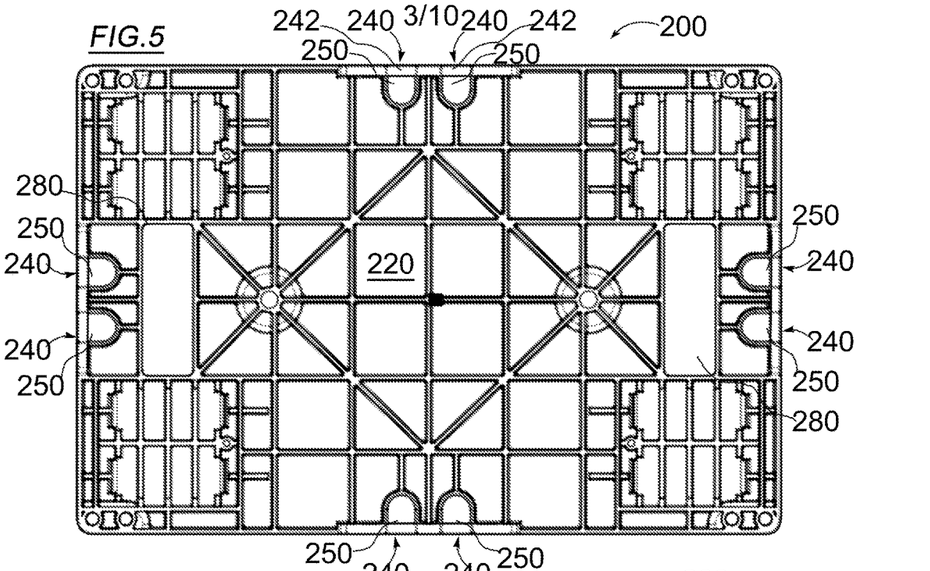
FIG. 5 is a bottom plan view of an embodiment according to the present invention.
Figure 6:
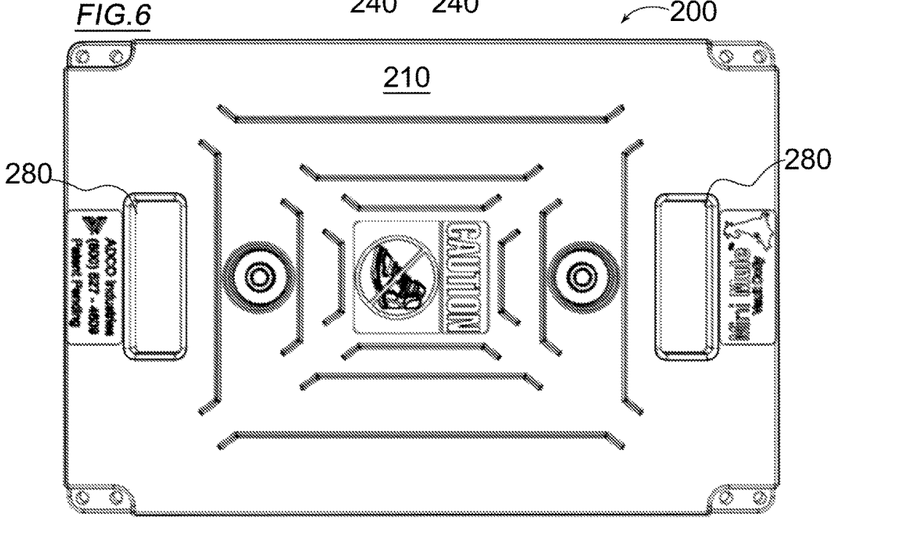
FIG. 6 is a top plan view of the embodiment shown in (FIG. 5)
Figure 7:
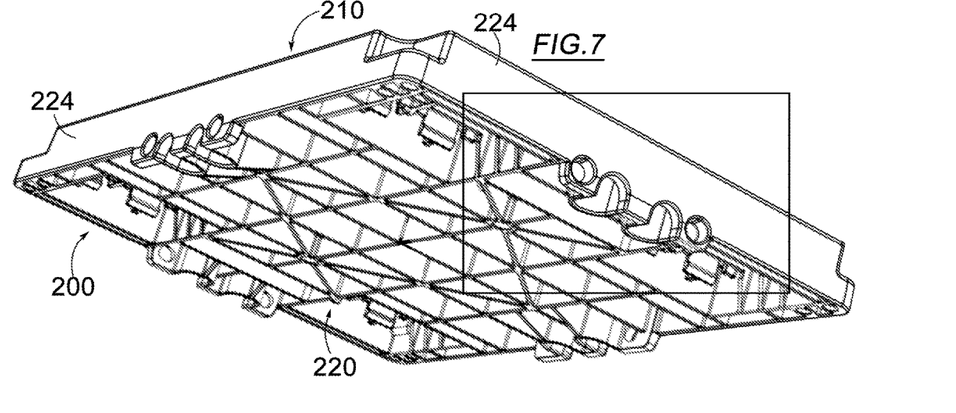
FIG. 7 is a bottom up perspective view of the embodiment shown in (FIG. 5)
Figure 8:
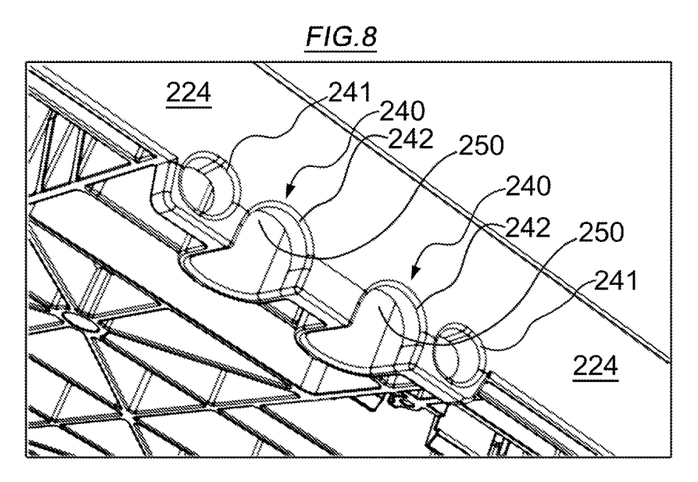
FIG. 8 is a detail view of (FIG. 7)
Figures 9, 10A, 10B:
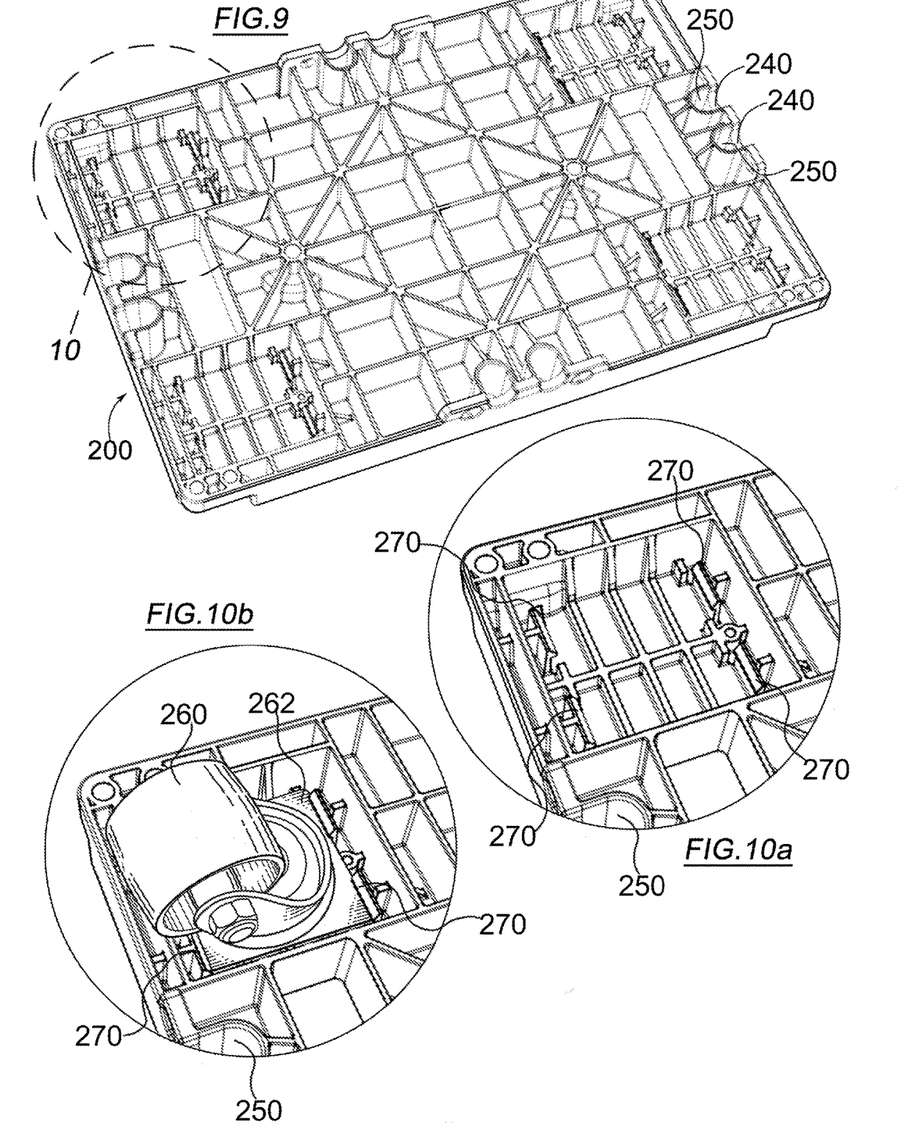
FIG. 9 is a bottom perspective view of the embodiment shown in (FIG. 5)
FIG. 10*a* is a first detail view of (FIG. 9) showing caster fitment tabs ( )
FIG. 10*b* is a second detail view of (FIG. 9), showing the fitment of a caster assembly in a pallet dolly body.

FIGS. 5 and 6 show respectively, a view of the underside and top of a pallet dolly. Arranged about the periphery of the pallet dolly are guide entryways (240) that typically posses an arched structure similar to a barrel vault that extends partially into the recess of the guide entryway, forming an overhang (242) (see FIG. 8) which is an enlarged detail of (FIG. 7). With the exception of the guide entryways which are substantially flush with the border/edge of the pallet, the border edge is an otherwise smooth planar surface such that when a box or other article is overhanging the edge, the guide entryways (240) may be located blindly by sliding the caps (140) of the lightweight dolly puller (100) along the edge, so that the guide entryways may be blindly located by feel. Once the guide entryways are located either by feel or visually, in order to dock the dolly puller with the pallet dolly, the caps of the projecting portions are tilted forward slightly and inserted into the guide entryways. Once the caps (140) have cleared the overhangs (242), the dolly puller is tilted rearwardly essentially trapping the capped portions behind the overhangs, and enabling the use of the puller to tug the pallet into a desired position. Un-docking procedure is the reverse of the foregoing docking process. Caps (140) may or may not extend to contact the ceiling of the recess of the guide entryway. In cases where the caps are of sufficient length to contact with the ceiling of the recesses, it is possible that a slight lifting effect may be produced by tilting the handle (120) of dolly puller rearward, which may be useful in facilitating a change of direction, or prompting initial movement over an uneven floor.

Figure 11:
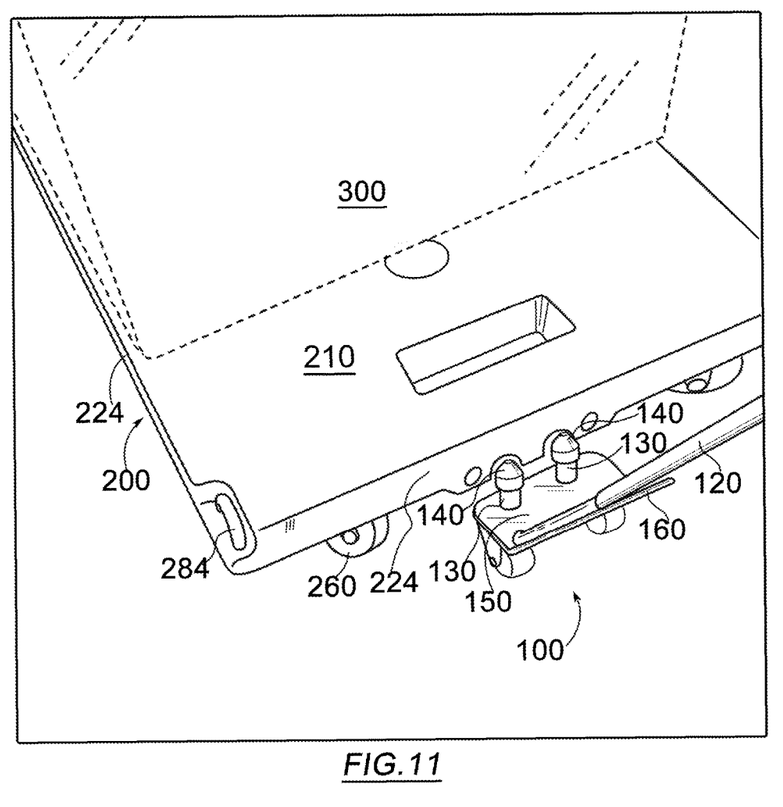
FIGS. 11-14 show in sequential perspective views, a typical use of an embodiment of the present invention.
Figure 12:
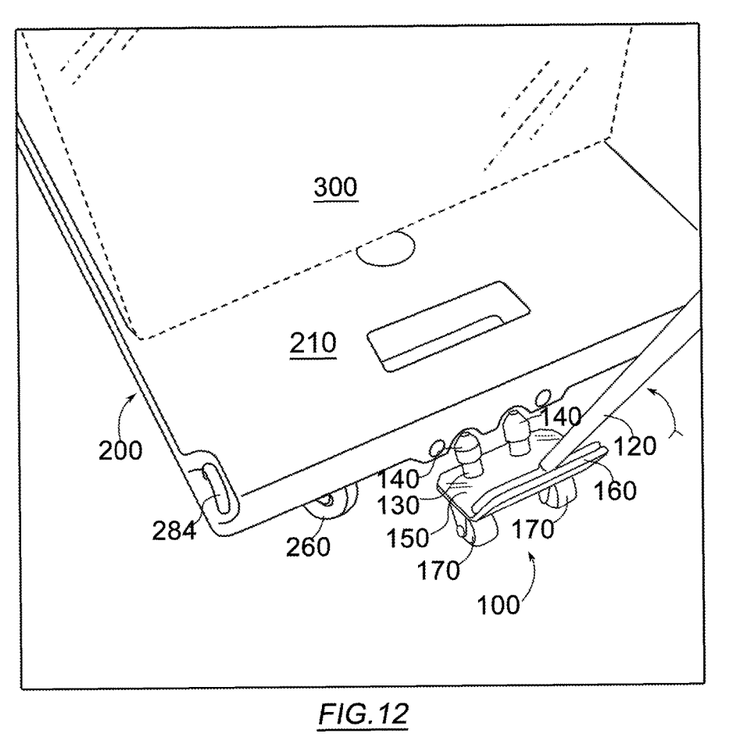
Figure 13:
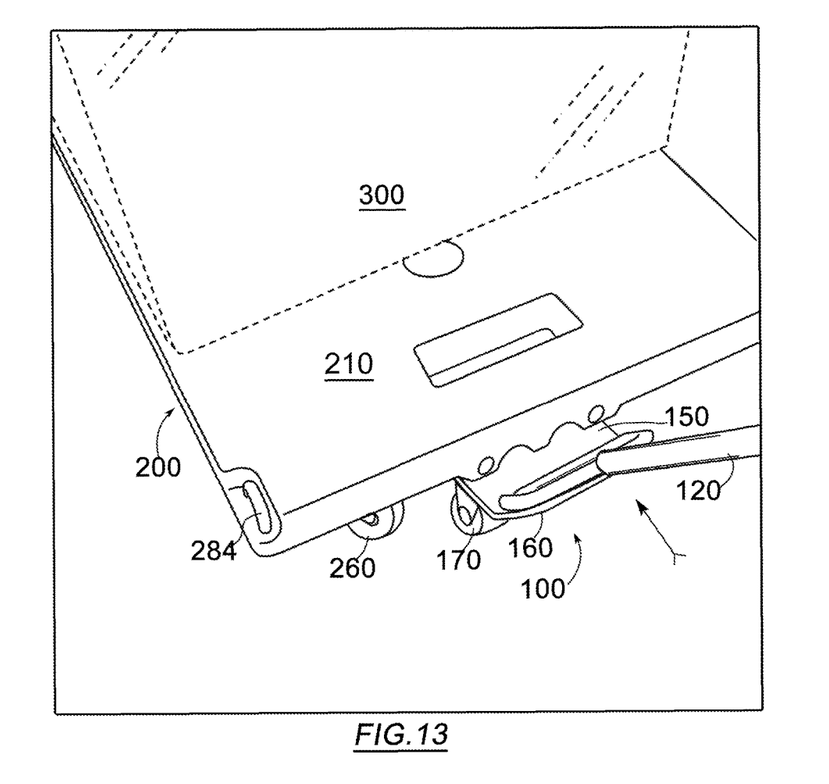

Referring to FIGS. 11-13, a process for docking the dolly puller to the pallet dolly is shown that includes the sequential steps of:
(1) positioning the dolly puller adjacent one or more guide entryways;
(2) tilting the projecting portions forward in order to move the caps (140) past overhang(s) (242);
(3) Once the projecting portions are nested in the recesses of the guide entryways, tilting the projecting portions rearwardly, trapping the caps (140) behind the overhang(s) (242).

Figure 14:
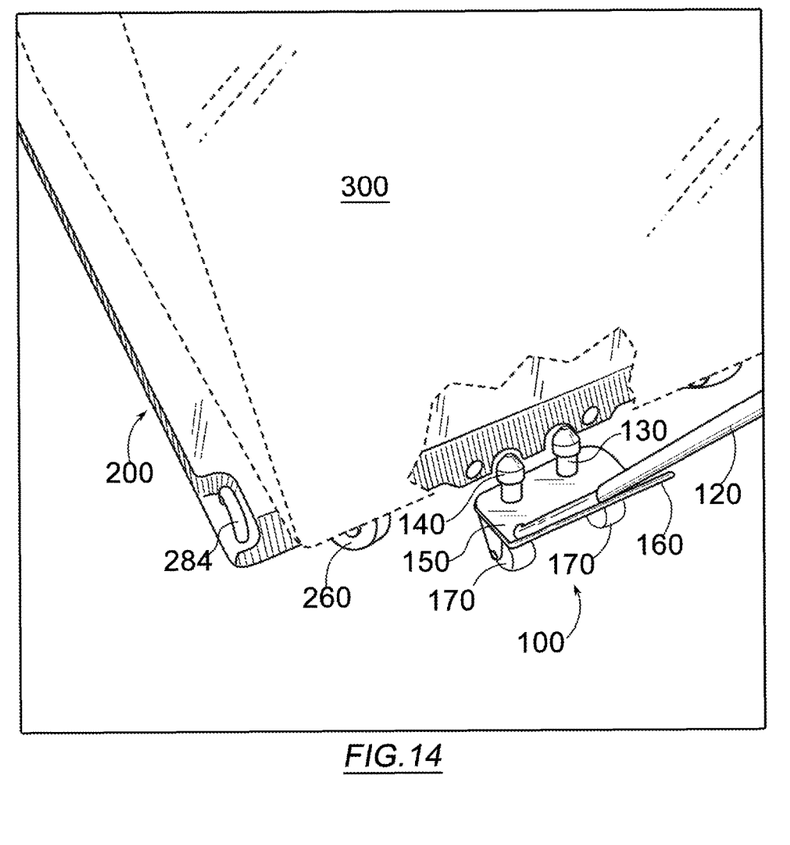

FIG. 14 illustrates the positioning of the dolly puller when line of sight to the guide entryways is blocked by a box, e.g., a crate of merchandise. The guide entryways may be easily located by positioning the dolly puller generally centrally and adjacent to one of the pallet dolly sides, and sliding or tilting the capped portions from side to side until contact is made.

Figure 15:
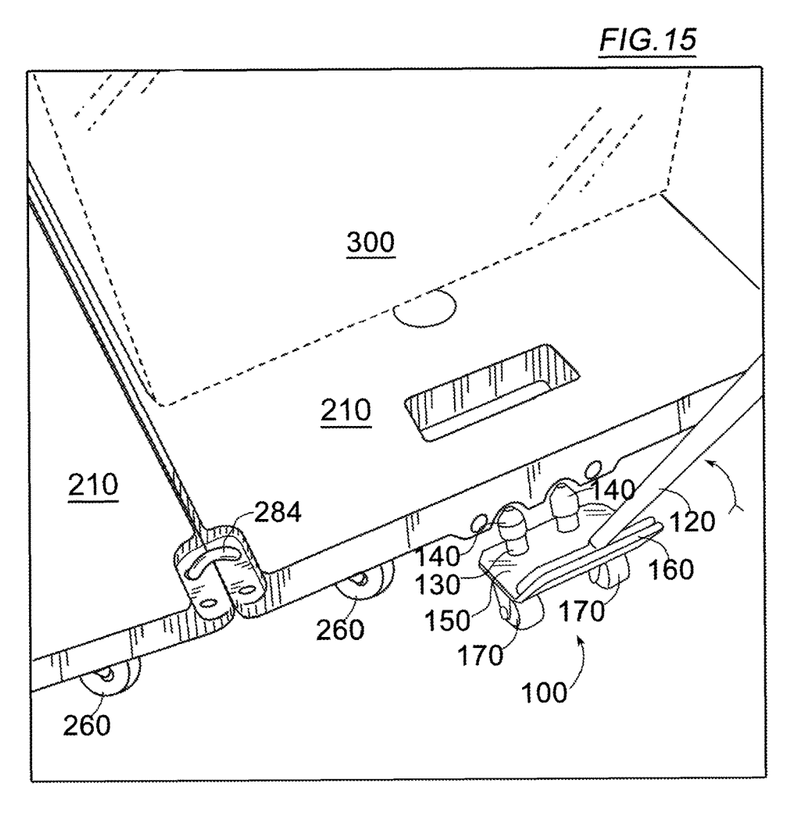
FIG. 15 shows a linking of one pallet to another via ring 284 and one of the corner apertures.
Figure 16:
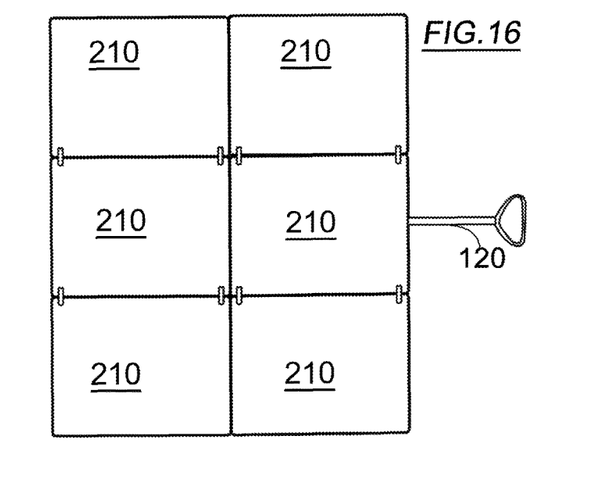
FIG. 16 shows a possible interlinking arrangement of a number of pallets via multiple rings 284.

As shown in (FIGS. 15 and 16), the pallets (210) may be interlinked at their corners and various arrangements of multi-part pallets obtained. As shown in (FIGS. 5, 7 and 9), all sides of the pallet includes a pair of guideway entrys. As such, interlinked pallets may be easily docked on any exposed side and maneuvered easily.

It should be understood that the drawings and detailed description herein are to be regarded in an illustrative rather than a restrictive manner, and are not intended to be limiting to the particular forms and examples disclosed. Accordingly, it is intended that this disclosure encompass any further modifications, changes, rearrangements, substitutions, alternatives, design choices, and embodiments as would be appreciated by those of ordinary skill in the art having benefit of this disclosure, and falling within the spirit and scope of the following claims.

The invention claimed is:
1. A pallet dolly moving system comprising:
1) a pallet dolly puller including a handle, a platform portion in , a platform stop, a plurality of wheel assemblies, at least one projecting portion including at least one bulbous cap portion, the at least one projecting portion is mounted immovably to the platform portion; and,
2) a pallet dolly with a top, sides, a bottom and a guide entryway located at sides of the pallet dolly for accepting and guiding portions of the projecting portion of the pallet dolly puller.

2. The dolly puller according to claim 1, wherein the at least one cap portion is mounted to an end of the at least one projecting portion.

3. The dolly puller according to claim 1, wherein the at least one projecting portion extends from the platform portion.

4. The pallet dolly according to claim 1, wherein the guide entryway has an opening configured to accept the at least one projecting portion and the at least one cap portion of the dolly puller.

5. The system according to claim 1, wherein the platform stop defines a self-distancing gauge for maintaining positioning of the at least one end when coupled to the platform.

6. The system according to claim 1, wherein the at least one guide entryway is configured to direct tapered portions of the at least one cap portion.

7. The system according to claim 1, wherein the caps are tapered.

8. The system according to claim 1, wherein the caps depress.

9. The system according to claim 1, wherein the caps are rotational.

10. The system according to claim 1 wherein the guide entryway further comprises a recess adapted to receive and secure the at least one cap portion behind an overhanging portion.

11. The system according to claim 1 wherein the pallet dolly has tabs that secure the wheel assemblies during pallet dolly assembly without using threaded fasteners or rivets.

12. A method for coupling a pallet dolly to a pallet dolly puller to move the pallet dolly comprising the steps of:
(1) providing a pallet dolly puller that comprises: a handle, a platform portion, a plurality of wheel assemblies, at least one projecting portion mounted immovably to the platform portion in a fixed angular disposition with at least one bulbous cap atop the at least one projecting portion, and, a pallet dolly that comprises: a top, sides, a bottom and one or more guide entryways located at sides of the pallet dolly for accepting and guiding portions of the projecting portion of the pallet dolly puller;
(2) positioning the pallet dolly puller adjacent the one or more guide entryways;
(3) tilting the at least one projecting portion forward and downwardly toward sides of the pallet dolly in order to move the at least one cap of the pallet dolly into the at least one or more guide entryways; and,
(4) After insertion of the at least one cap into the at least one guide entryway, tilting the at least one projecting portion rearwardly, and trapping the at least one cap behind overhung portions of the pallet dolly sides.

* * * * *